United States Patent
Lutz et al.

(10) Patent No.: US 7,974,387 B2
(45) Date of Patent: Jul. 5, 2011

(54) PROACTIVE ANALYSIS OF COMMUNICATION NETWORK PROBLEMS

(75) Inventors: Charles Lutz, Flowery Branch, GA (US); Nicole LaTrese Nall, Stone Mountain, GA (US); Daniel Spain, Alabaster, AL (US); Olyn Ray Sexton, Sr., W. Columbia, SC (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1288 days.

(21) Appl. No.: 11/552,024

(22) Filed: Oct. 23, 2006

(65) Prior Publication Data

US 2008/0195614 A1    Aug. 14, 2008

(51) Int. Cl.
*H04M 1/24* (2006.01)
*H04M 3/08* (2006.01)
*H04M 3/22* (2006.01)

(52) U.S. Cl. ............. 379/29.09; 379/1.01; 379/9.03; 379/14.01; 379/15.01; 379/32.01

(58) Field of Classification Search ........... 379/1.01, 379/9, 9.02, 9.03, 9.04, 10.01, 29.01, 29.09, 379/32.01, 14.01, 15.01
See application file for complete search history.

(56) References Cited

U.S. PATENT DOCUMENTS

| | | | | |
|---|---|---|---|---|
| 4,456,788 | A * | 6/1984 | Kline et al. | 379/137 |
| 6,931,102 | B2 * | 8/2005 | Onweller et al. | 379/9 |
| 6,957,257 | B1 * | 10/2005 | Buffalo et al. | 709/224 |
| 7,742,576 | B2 * | 6/2010 | Jean et al. | 379/9.03 |
| 2002/0078017 | A1 * | 6/2002 | Cerami et al. | 707/1 |
| 2002/0087680 | A1 * | 7/2002 | Cerami et al. | 709/224 |
| 2004/0031059 | A1 * | 2/2004 | Bialk et al. | 725/129 |
| 2004/0254757 | A1 * | 12/2004 | Vitale et al. | 702/122 |
| 2006/0233312 | A1 * | 10/2006 | Adams et al. | 379/21 |
| 2007/0100782 | A1 * | 5/2007 | Reed et al. | 707/1 |
| 2007/0116185 | A1 * | 5/2007 | Savoor et al. | 379/9 |

* cited by examiner

*Primary Examiner* — Binh K Tieu
(74) *Attorney, Agent, or Firm* — Hope Baldauff Hartman, LLC

(57) ABSTRACT

Customer problem reports are collected and analyzed in order to monitor, analyze, and proactively prevent the same or similar problems from reoccurring in the future. A selection of customer problem reports are received and may be prioritized for analysis. Associated network elements may be scheduled for monitoring and/or testing at a greater frequency. Network elements may be the subject of new problem reports which may be dispatched to technicians for proactive analysis and repair.

19 Claims, 3 Drawing Sheets

PROACTIVE ANALYSIS OF COMMUNICATION NETWORK PROBLEMS

FIELD OF THE INVENTION

The present invention relates to communications network operations. More particularly, the present invention relates to proactively handling network problems in a communications network.

BACKGROUND

Troubleshooting link problems in a communications network can be an inexact science. When a customer calls to report a problem with a connection, the problem may not be easily repeatable or may be sporadic in occurrence, thus inhibiting the ability to diagnose and solve the problem on the part of the communications service provider. This may lead to a situation where link problems are repeatedly called in for trouble tickets without an effective opportunity to diagnose and repair the problem. In this situation, if customers report the same problem after the problem has not been fixed, trouble tickets for the same link may appear multiple times without satisfactory resolution. In some situations, 25% or more of trouble tickets may be repeats of earlier reported problems. Repeated trouble tickets may cause unnecessary and inefficient use of service provider resources in recording, diagnosing, and repairing the same problem multiple times.

Ultimately, customers may end their relationship with the service provider if they perceive that nothing is being done to solve their problems, regardless of the fact that the service provider may be unable to diagnose the problem. Therefore, there is a need to proactively identify potential problem links in a communications network, and to analyze those links as part of an effort to diagnose and fix the problems.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems according to exemplary embodiments of the invention proactively handling network troubles in a communications network. Customer problem reports are received and may be prioritized for analysis in order to prevent future troubles. Associated network elements may be flagged for additional testing and/or monitoring. Technicians may be instructed to analyze and repair network elements in advance of any future problems.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

DETAILED DESCRIPTION

Figure 1:
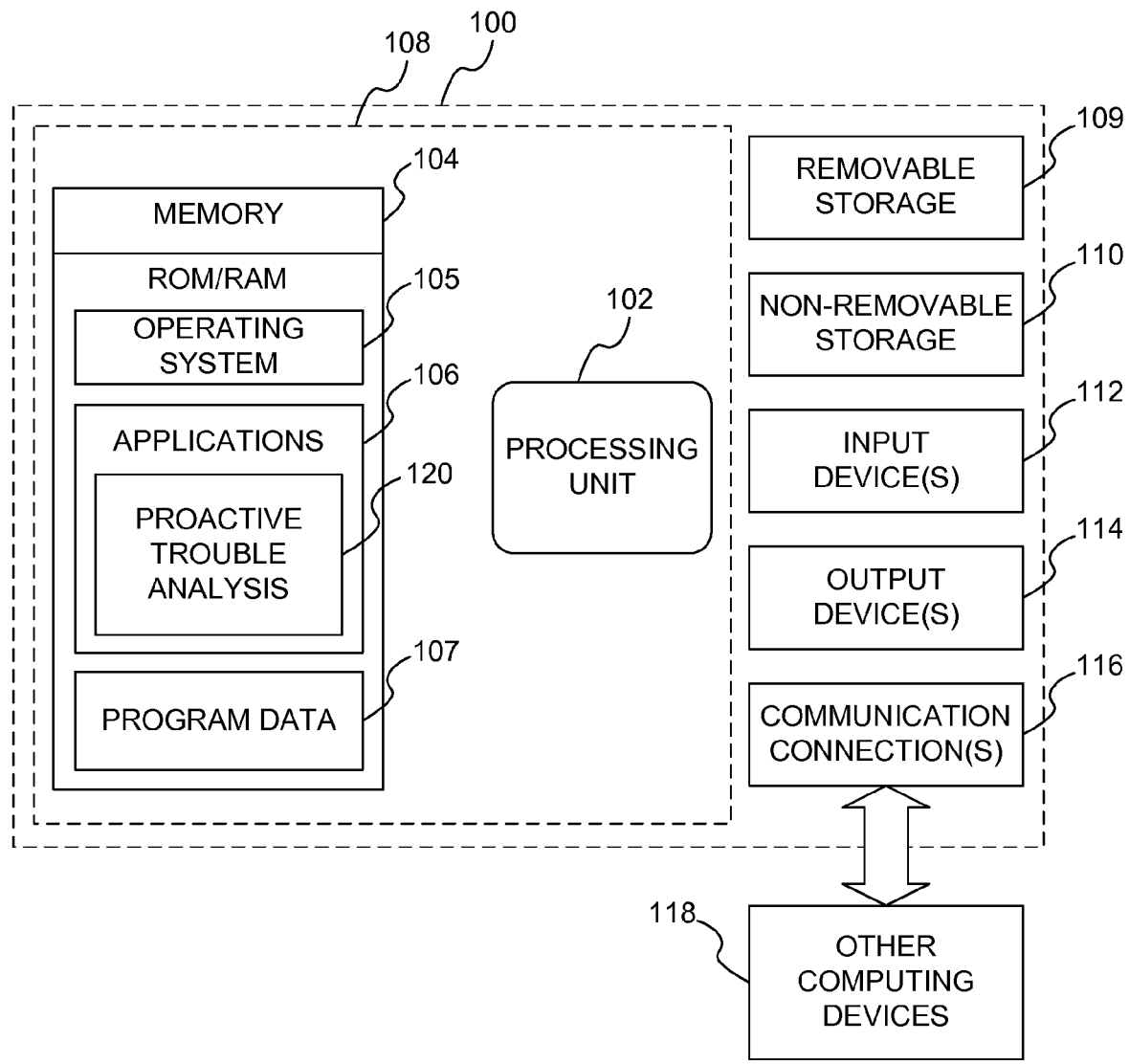
FIG. 1 is a block diagram illustrating a suitable computing environment in which proactive trouble analysis may be performed.

The following detailed description is directed to systems and methods for proactive monitoring and/or testing of troubled links in a communications network. In the following detailed description, references are made to the accompanying drawings that form a part hereof, and which are shown, by way of illustration, using specific embodiments or examples. Referring now to the drawings, in which like numerals represent like elements through the several figures, aspects of the systems and methods provided herein will be described.

With reference to FIG. 1, an embodiment may include a computing device, such as computing device 100. In a basic configuration shown in FIG. 1, computing device 100 includes at least one processing unit 102 and memory 104. Depending on the configuration of computer device 100, memory 104 may be volatile (e.g., Random Access Memory (RAM)), non-volatile (e.g., Read-Only Memory (ROM), Flash, etc.), or some combination thereof. Memory 104 serves as a storage location for operating system 105, one or more applications 106, and includes program data 107, as well as other programs. In one embodiment, applications 106 includes a proactive trouble analysis application 120, a module including similar logic, or any other set of instructions comprising such logic. It should be noted that the logic of proactive trouble analysis application 120 may be distributed and/or shared across multiple computing devices.

Computing device 100 may include additional features and functionality other than the features shown within dashed-line box 108. For example, computing device 100 may include additional data storage components, including both removable storage 109 (e.g., floppy disks, memory cards, compact disc (CD) ROMs, digital video discs (DVDs), external hard drives, universal serial bus (USB) key drives, etc.) and non-removable storage 110 (e.g., magnetic hard drives).

Computer storage media may include media implemented in any method or technology for storage of information, including computer readable instructions, data structures, program modules, or other data. Memory 104, removable storage 109, and non-removable storage 110 are all examples of computer storage media. Further examples of such media include RAM, ROM, electrically-erasable programmable ROM (EEPROM), flash memory, CD-ROM, DVD, cassettes, magnetic tape, and magnetic disks. Any such computer storage media may be accessed by components which are a part of computing device 100, or which are external to computing device 100 and connected via a communications link (e.g., Bluetooth, USB, parallel, serial, infrared, etc.). Computing device 100 may also include input devices 112, for example, a keyboard, mouse, digitizing pen, microphone, touchpad, touch-display, etc. Output devices 114 may include, for example, displays, speakers, and printers. Additional forms of storage, input, and output devices may be utilized.

Computing device 100 may also include one or more communication connections 116 which allow computing device 100 to communicate with other computing devices 118, such as over a network (e.g., a local area network (LAN), the Internet, etc.). Communication media, in the form of computer readable instructions, data structures, program modules, or other data in a modulated data signal, may be shared with and by device 100 via communication connection 116. Modulated data signal may mean a signal that has one or more of its characteristics set or changed in such a manner as to encode information in the signal, and may include a modulated carrier wave or other transport mechanism. Communication connection 116 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit (or some combination thereof) with other computing devices 118.

Figure 2:
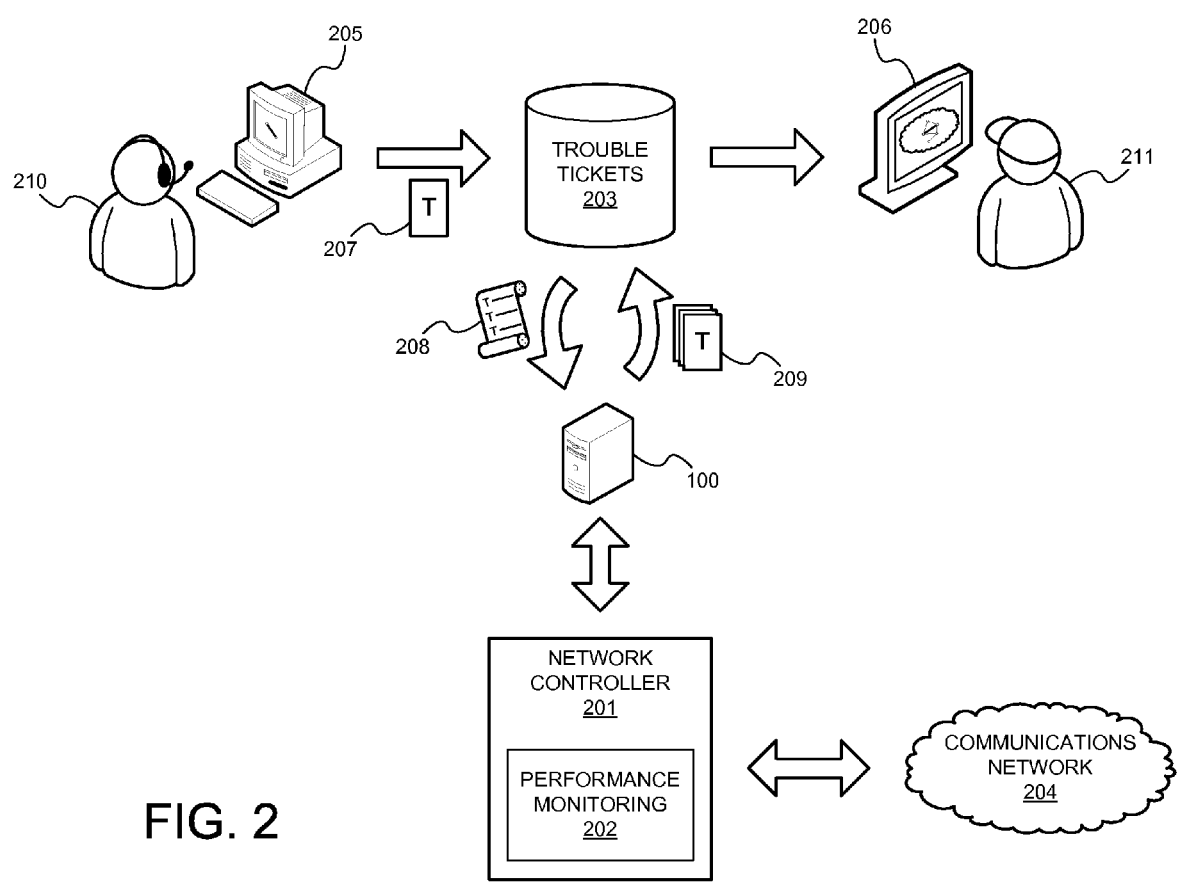
FIG. 2 depicts an example of a system incorporating proactive trouble analysis.

FIG. 2 depicts an example of a system incorporating proactive trouble analysis methods. The elements depicted in this example are merely intended to be representative of functional components and should not be construed to constrain the attached claims. Although computing device 100 storing proactive trouble analysis application 120 in memory 104 is depicted as distinct from both a database 203 and a network controller 201, it should be appreciated that the proactive trouble analysis application 120 may reside on the same machines housing either the database 203 or the network controller 201 or both the database 203 and the network controller 201.

In order to minimize repetitive trouble tickets, proactive trouble analysis application 120 may be used to regularly analyze trouble tickets stored in database 203 to identify potentially troubled elements in communications network 204. By regularly analyzing and identifying potentially troubled elements in communications network 204, links and systems can be tested and/or monitored in order to catch problems before the problems again affect a customer adversely. Communications network 204 may carry multiple forms of communication, including, for example, telecommunications, data (e.g., Internet packets), and broadcast services (e.g., cable television). Once troubled elements are determined by proactive trouble analysis application 120, network controller 201, in communication with computing device 100, may receive information regarding the troubled elements and monitor performance of the troubled elements within communications network 204 in the form of performance monitoring logic 202. In an embodiment of the present invention, performance monitoring logic 202 may communicate with, analyze, and/or manipulate elements within communications network 204.

When a customer (not shown) has a problem with the customer's communication connection, the customer may contact a service provider for support. The problem may be the result of a problem network element in communications network 204. This contact may be in the form of a submission on a website, or a phone call to an operator 210, among other forms of contact. In the case of a phone call to operator 210, the operator may enter information about the problem into a trouble ticket 207 via workstation 205. Trouble ticket 207 may include information about the problem including affected customer or customers, affected network elements (e.g., circuits, systems, etc.), date, time, symptoms. Operator 210 may remotely perform tests and diagnose and fix some problems, possibly resolving and closing trouble ticket 207 during the course of the phone call. Whether resolved or not, trouble ticket 207 may be stored in a database 203 of trouble tickets. Technician 211 may view trouble ticket 207 via, for example, workstation 206 and diagnose and repair the problem if the ticket is still unresolved.

Proactive trouble analysis application 120 may analyze a trouble ticket collection 208 from database 203 in order to determine which elements of communications network 204 should be marked for additional analysis and/or repair. The trouble ticket collection 208 may be selected from database 203 using certain criteria. Examples of criteria include selecting all trouble tickets 207 which involve a certain subset of problems (e.g., having certain trouble codes); selecting all trouble tickets 207 opened in the last 30 days; selecting all trouble tickets 207 for which a similar problem had previously been reported; selecting trouble tickets which share common traits (e.g., same network element, same customer). These are merely examples of ways in which trouble ticket information may be selected. Other criteria may be utilized to select trouble tickets 207 as potential candidates for additional analysis. The trouble ticket collection 208 may be selected on a periodic basis in order to catch new trouble tickets 207 and/or to catch updates to existing trouble tickets. For example, the trouble ticket collection 208 may be selected and retrieved by proactive trouble analysis application 120 from database 203 on an hourly or daily basis. Likewise, database 203 may select and transmit the trouble ticket collection 208 on a regular or ad hoc schedule using a stored procedure or saved query. The trouble ticket collection 208 may be assembled into a text file for use by proactive trouble analysis application 120.

Further analysis may be performed on trouble tickets 207 by proactive trouble analysis application 120. In particular, proactive trouble analysis application 120 may analyze and rank the trouble tickets 207 selected from the database 203 for further analysis and/or repair. Such a ranking may be based on problem severity, number of trouble tickets 207 associated with a network element, size of customer, number of customers affected, and so forth. Such a ranking may be used to prioritize and/or triage problems based on the availability of analysis or repair resources. Additional analysis may involve reviewing recent trouble tickets 207 for patterns which may identify problems associated with more than one customer. For example, if customers in a certain geographic area are experiencing similar problems, such trouble tickets 207 may be grouped and/or flagged for higher priority, since their analysis and repair may have broader effect.

Once the trouble ticket collection 208 has been selected and ranked, additional steps may be taken in order to have affected network elements analyzed. For example, a network element may be identified by proactive trouble analysis application 120 for additional monitoring, and information regarding the identified network element communicated to performance monitoring 202 via network controller 201. If, for example, a network element is normally monitored and/or tested once a day, the network element may be flagged for hourly monitoring and/or testing. In addition or alternative to automated performance monitoring, identified network elements may be flagged by proactive trouble analysis application 120 for additional analysis and repair by technician 211. This may be accomplished by creating new trouble tickets 209 covering the affected network elements. New trouble tickets 209 may be created by proactive trouble analysis application 120 and added to database 203. Alternatively, new trouble tickets 209 may be manually added to database 203 by a person based on output from proactive trouble analysis application 120. New trouble tickets 209 may be prioritized appropriately so that they are handled only in particular conditions. For example, new trouble tickets 209 may be given a lower priority such that technician 211 will only work on the new trouble tickets 209 at times when immediate network problems are at a lull. Some of the new trouble tickets 209 may be given a higher priority if a particular problem is especially persistent and/or affects a large number of customers. New trouble tickets 209 may also include periodic maintenance requests which may be given a lower priority, and which also may be handled during slow periods.

Figure 3:
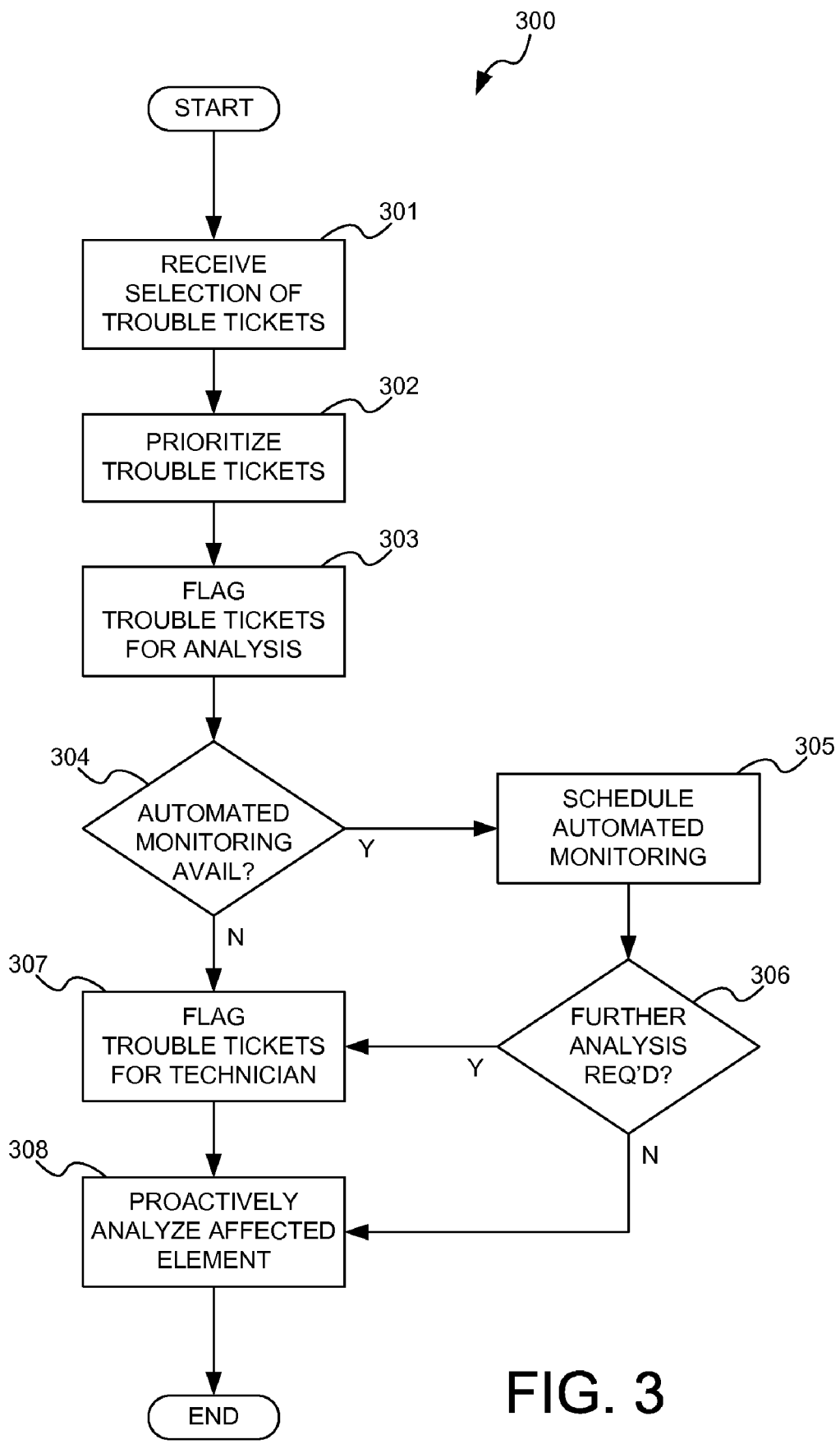
FIG. 3 is a flowchart depicting an example of a process for proactively analyzing trouble reports.

FIG. 3 is a flowchart depicting an example of a process 300 for proactively analyzing trouble reports for a communications network. Process 300 may be repeated at regular intervals (e.g., hourly) or upon the occurrence of some event (e.g., certain number of new trouble tickets created). The logical operations of the various implementations presented, including those of FIG. 3, may be (1) a sequence of computer implemented acts or program modules running on one or more computers 100 and/or (2) interconnected machine logic circuits or circuit modules within computing device 100. The implementation is a matter of choice dependent on the performance requirements of the computer on which the embodiments are implemented. Accordingly, the functional operations making up the implementations are referred to variously as operations, structural devices, acts, or modules. It will be recognized by one skilled in the art that these operations, structure devices, acts, and modules may be implemented in software, in firmware, in special purpose digital logic, and/or any combination thereof without deviating from the spirit and scope of the attached claims. Moreover, it will be apparent to those skilled in the art that the operations described may be combined, divided, reordered, skipped, and otherwise modified, also without deviating from the spirit and scope of the attached claims.

At operation 301, a trouble ticket collection 208 is received. The trouble ticket collection 208 may not be a full accounting of each trouble ticket 207, but merely a listing of relevant information for the selected tickets, including, for example, affected customer(s), affected network element(s), and problem date & time. The trouble ticket collection 208 may be selected based on a number of criteria, such as, for example, particular trouble codes associated with trouble tickets 207, particular date & time of the problem, particular circuits or types of circuits affected, and particular customer or types of customers affected. The trouble ticket collection 208 may be received in a number of forms including, for example, object instances, flat files, query results, manual input.

At operation 302, if not already done, proactive trouble analysis application 120 ranks and/or prioritizes the trouble ticket collection 208. This may include ranking, scoring, or otherwise assigning an importance to problems in order to ease the assignment of limited resources (e.g., computing resources, technicians, bandwidth, etc.). Examples of prioritization are provided above with reference to FIG. 2. The received collection of trouble tickets 208 may already include rank and/or priority information, obviating the need for this operation.

At operation 303, based on priority and/or other information, proactive trouble analysis application 120 may flag particular trouble tickets 207 from the collection of trouble tickets 208 for further analysis. A simple example of flagged trouble tickets may include trouble tickets issued or updated in the last 30 days. Trouble tickets 207 which are repeated or which have similar information may be prioritized higher, possibly indicating that customers are continuing to experience a problem. Network elements associated with flagged trouble tickets may similarly be flagged for analysis as a part of operation 303. At this point, additional systems or individuals may be informed as to network elements which may be in need of greater attention.

If, at decision 304, automated collection of performance monitoring data is available for a network elements associated with one or more trouble tickets, then at operation 305, proactive trouble analysis application 120 may flag the network elements to start or increase automated performance reporting. Performance monitoring software, such as might be provided by Lucent's Integrated Network Controller®, may remotely monitor elements of communications network 204 (e.g., circuits, systems, etc.), looking for problems. Performance monitoring software may monitor and/or perform such tests on a regular basis, such as once a day or once an hour. Monitoring and/or testing may in some cases be stepped up in order to increase the likelihood of catching a sporadically occurring problem. Network elements may be adjusted or repaired in an automated fashion if analysis finds a particular problem. For example, a network element (e.g., a router) may simply need to be reset or restarted.

If, at decision 304, no automated monitoring is available, or if at decision 306, further intervention is required, then at operation 307, trouble tickets are flagged for analysis and/or repair by a technician. Network elements requiring analysis and/or repair by a technician may be identified by creating new trouble tickets 209 in the same database 203 from which the original trouble tickets 207 were selected. At operation 308, new trouble tickets 209 may be created through manual analysis and/or repair or by an automated process and may then be accessed by technicians 211 who proactively analyze and potentially repair a problem. Technicians 211 may be aided by reviewing the results of any automated performance monitoring. Likewise, at operation 308, should no further technician intervention be required, additional analysis and/or repair may be performed using additional automated techniques. Using process 300 and other similar processes, recently reported problems can be further monitored and analyzed to ensure that they do not become repeat problems.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for handling affected network elements in a communications network, the method comprising:
   accessing a database of trouble tickets, wherein the trouble tickets comprise resolved trouble tickets and unresolved trouble tickets;
   selecting, from the database of the trouble tickets, a portion of the trouble tickets to be further analyzed based on a first criteria, the portion of the trouble tickets associated with the affected network elements;
   ranking the portion of the trouble tickets based on a second criteria to determine an order for applying further analysis to the affected network elements;
   based on the portion of the trouble tickets as ranked, identifying an affected network element associated with a trouble ticket of the portion of the trouble tickets for further analysis; and
   providing instructions that a frequency of monitoring the affected network element be increased.

2. The method of claim 1, wherein the first criteria comprises a particular problem such that the portion of the trouble tickets selected are associated with the particular problem.

3. The method of claim 1, wherein the first criteria comprises a previously reported problem such that the portion of the trouble tickets selected are associated with a problem similar to a previously reported problem.

4. The method of claim 1, wherein providing the instructions that the frequency of monitoring the affected network element be increased comprises creating a new trouble ticket for the affected network element.

5. The method of claim 4, wherein the new trouble ticket is delivered for manual analysis by a technician.

6. The method of claim 1, wherein the first criteria comprises a specified period of time reported such that the portion of the trouble tickets selected are reported within the specified period of time.

7. The method of claim 1, wherein the first criteria comprises a common trait such that the portion of the trouble tickets selected are associated with the common trait.

8. The method of claim 1, wherein the second criteria comprises a number of the trouble tickets associated with each affected network element such that the affected network element associated with a highest number of the trouble tickets is ranked above other affected network elements.

9. A system for handling affected network elements in a communications network, the system comprising:
 memory for storing a program containing code for handling the affected network elements in the communications network; and
 a processor functionally coupled to the memory, the processor being responsive to computer-executable instructions contained in the program and configured at least to:
  access a database of trouble tickets, wherein the trouble tickets comprise resolved trouble tickets and unresolved trouble tickets,
  select, from the database of the trouble tickets, a portion of the trouble tickets to be further analyzed based on a first criteria, the portion of the trouble tickets associated with the affected network elements,
  rank the portion of the trouble tickets based on a second criteria to determine an order for applying further analysis to the affected network elements,
  based on the portion of the trouble tickets as ranked, identify an affected network element associated with a trouble ticket of the portion of the trouble tickets for further analysis, and
  provide instructions that a frequency of monitoring the affected network element be increased.

10. The system of claim 9, wherein the first criteria comprises a particular problem such that the portion of the trouble tickets selected are associated with the particular problem.

11. The system of claim 9, wherein providing the instructions that the frequency of monitoring the affected network element be increased comprises creating a new trouble ticket associated with the affected network element.

12. The system of claim 11, wherein the processor is further configured at least to deliver the new trouble ticket to a technician for manual analysis.

13. The system of claim 9, wherein the first criteria comprises a previously reported problem such that the portion of the trouble tickets selected are associated with a problem similar to a previously reported problem.

14. The system of claim 9, wherein the first criteria comprises a specified period of time reported such that the portion of the trouble tickets selected are reported within the specified period of time.

15. The system of claim 9, wherein the first criteria comprises a common trait such that the portion of the trouble tickets selected are associated with the common trait.

16. The system of claim 9, wherein the second criteria comprises a number of the trouble tickets associated with each affected network element such that the affected network element associated with a highest number of the trouble tickets is ranked above other affected network elements.

17. A computer-readable medium storing computer-executable instructions which, when executed by a computer, cause the computer at least to:
 access a database of trouble tickets, wherein the trouble tickets comprise resolved trouble tickets and unresolved trouble tickets;
 select, from the database of the trouble tickets, a portion of the trouble tickets to be further analyzed based on a first criteria, the portion of the trouble tickets associated with affected network elements;
 rank the portion of the trouble tickets based on a second criteria to determine an order for applying further analysis to the affected network elements;
 based on the portion of the trouble tickets as ranked, identify an affected network element associated with a trouble ticket of the portion of the trouble tickets for further analysis; and
 provide instructions that a frequency of monitoring the affected network element be increased.

18. The computer-readable medium of claim 17, wherein providing instructions that a frequency of monitoring the affected network element be increased comprises creating a new trouble ticket for the affected network element.

19. The computer-readable medium of claim 18, wherein the new trouble ticket is delivered for manual analysis by a technician.

* * * * *